(12) United States Patent
Murakami et al.

(10) Patent No.: US 9,419,709 B2
(45) Date of Patent: Aug. 16, 2016

(54) TRANSMISSION DEVICE AND METHOD FOR MEASURING DELAY

(71) Applicant: FUJITSU LIMITED, Kawasaki-shi (JP)

(72) Inventors: Tomoko Murakami, Kawasaki (JP);
Hideaki Sugiya, Fujisawa (JP);
Toshihiro Suzuki, Kawasaki (JP);
Shingo Hara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 13/705,783

(22) Filed: Dec. 5, 2012

(65) Prior Publication Data

US 2013/0195442 A1 Aug. 1, 2013

(30) Foreign Application Priority Data

Jan. 26, 2012 (JP) .................................. 2012-13809

(51) Int. Cl.
*H04B 10/079* (2013.01)
(52) U.S. Cl.
CPC .................................. *H04B 10/0795* (2013.01)
(58) Field of Classification Search
CPC .................................................. H04B 10/0795
USPC .............................. 398/25; 455/69; 370/509
See application file for complete search history.

(56) References Cited

U.S. PATENT DOCUMENTS

| 7,447,239 | B2* | 11/2008 | Carson | H04J 3/14 370/389 |
| 2006/0258298 | A1* | 11/2006 | Kim | H04B 17/0085 455/69 |
| 2008/0212961 | A1* | 9/2008 | Zhang | G06F 15/161 398/25 |
| 2009/0203377 | A1* | 8/2009 | Kawasaki | H04L 5/005 455/435.1 |
| 2011/0122790 | A1* | 5/2011 | Ogawa | H04L 43/0858 370/252 |
| 2011/0170860 | A1* | 7/2011 | Smith | H04J 3/0682 398/25 |
| 2012/0213508 | A1* | 8/2012 | Moynihan | H04J 3/1658 398/25 |

FOREIGN PATENT DOCUMENTS

| JP | 1-228339 | 9/1989 |
| JP | 2007-184687 | 7/2007 |

(Continued)

OTHER PUBLICATIONS

International Telecommunication Union (ITU-T) G.709/Y.1331, Interfaces for the Optical Transport Networks (OTN), (Dec. 2009).

(Continued)

*Primary Examiner* — David Payne
*Assistant Examiner* — Omar S Ismail
(74) *Attorney, Agent, or Firm* — Fujitsu Patent Center

(57) ABSTRACT

A transmission device transmits a frame to a correspondent device and receives a frame from the correspondent device. The transmission device includes: a measurement unit configured to perform a delay measurement that measures a period of time from when a frame is transmitted to the correspondent device until when a corresponding frame is received from the correspondent device; and a delay decision unit configured to determine a transmission delay between the transmission device and the correspondent device based on a plurality of target measurement results obtained from a plurality of delay measurements except for at least a first delay measurement among delay measurements performed by the measurement unit.

17 Claims, 11 Drawing Sheets

(56) References Cited

FOREIGN PATENT DOCUMENTS

| | | |
|---|---|---|
| JP | 2007-336191 | 12/2007 |
| JP | 2011-130000 | 6/2011 |

OTHER PUBLICATIONS

Draft ITU-T Recommendation G.798 (revised), "Characteristics of optical transport network hierarchy equipment functional blocks", Consent: Jun. 2010.

JPOA—Office Action of Japanese Patent Application No. 2012-013809 dated Jul. 21, 2015, with English translation of the relevant part, p. 1, line 27 to p. 2, line 28.

The Telecommunication Technology Committee, JT-G709 Interfaces for the Optical Transport Network (OTN), Japan, The Telecommunication Technology Committee, Mar. 1, 2011, 2.1 edition, all pages, URL http://www.ttc.or.jp/jp/document_list/pdf/j/STD/JT-G709v2.1.pdf.

JPOA—Office Action of Japanese Patent Application No. 2012-013809 dated Dec. 15, 2015, with English translation of the relevant part, p. 1, line 29 to p. 3, line 15.

* cited by examiner

FIG. 2

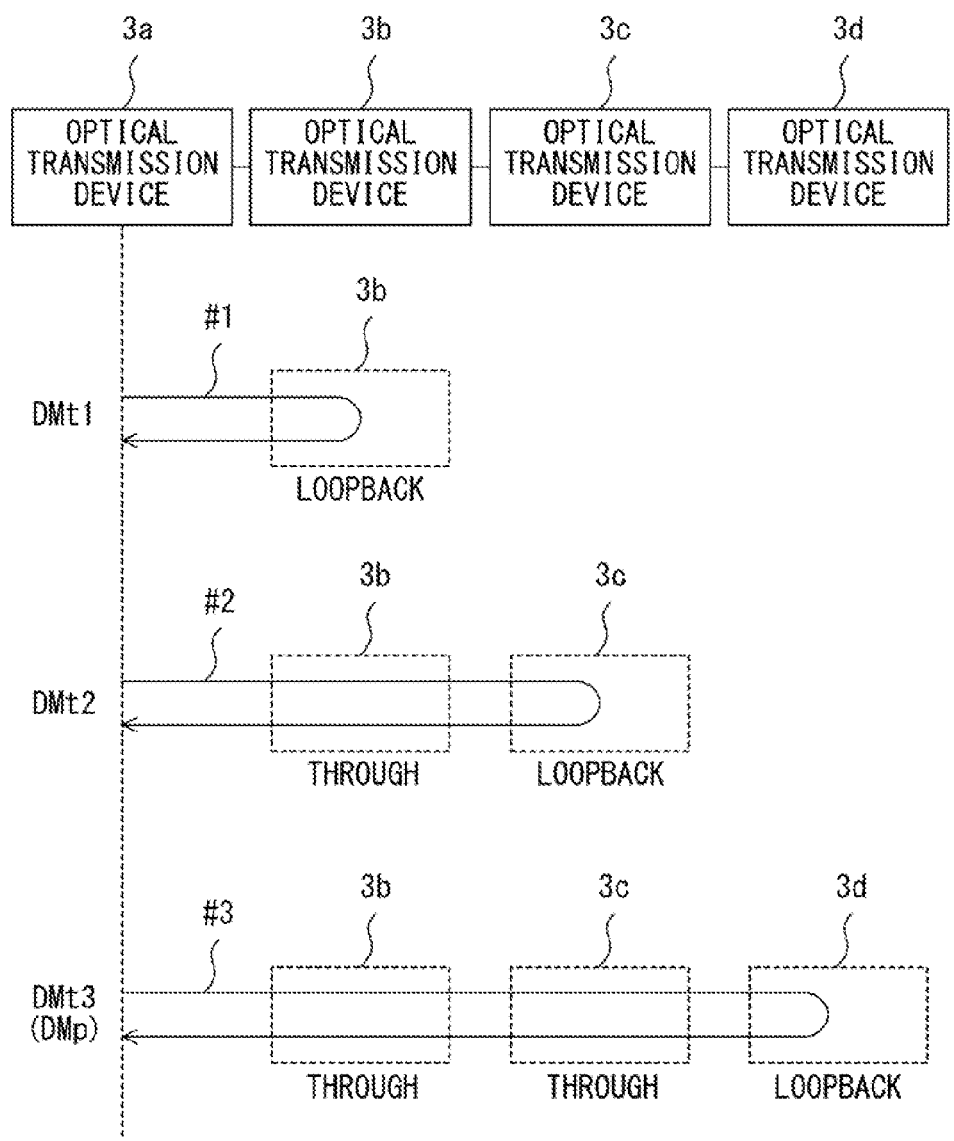
F I G. 3

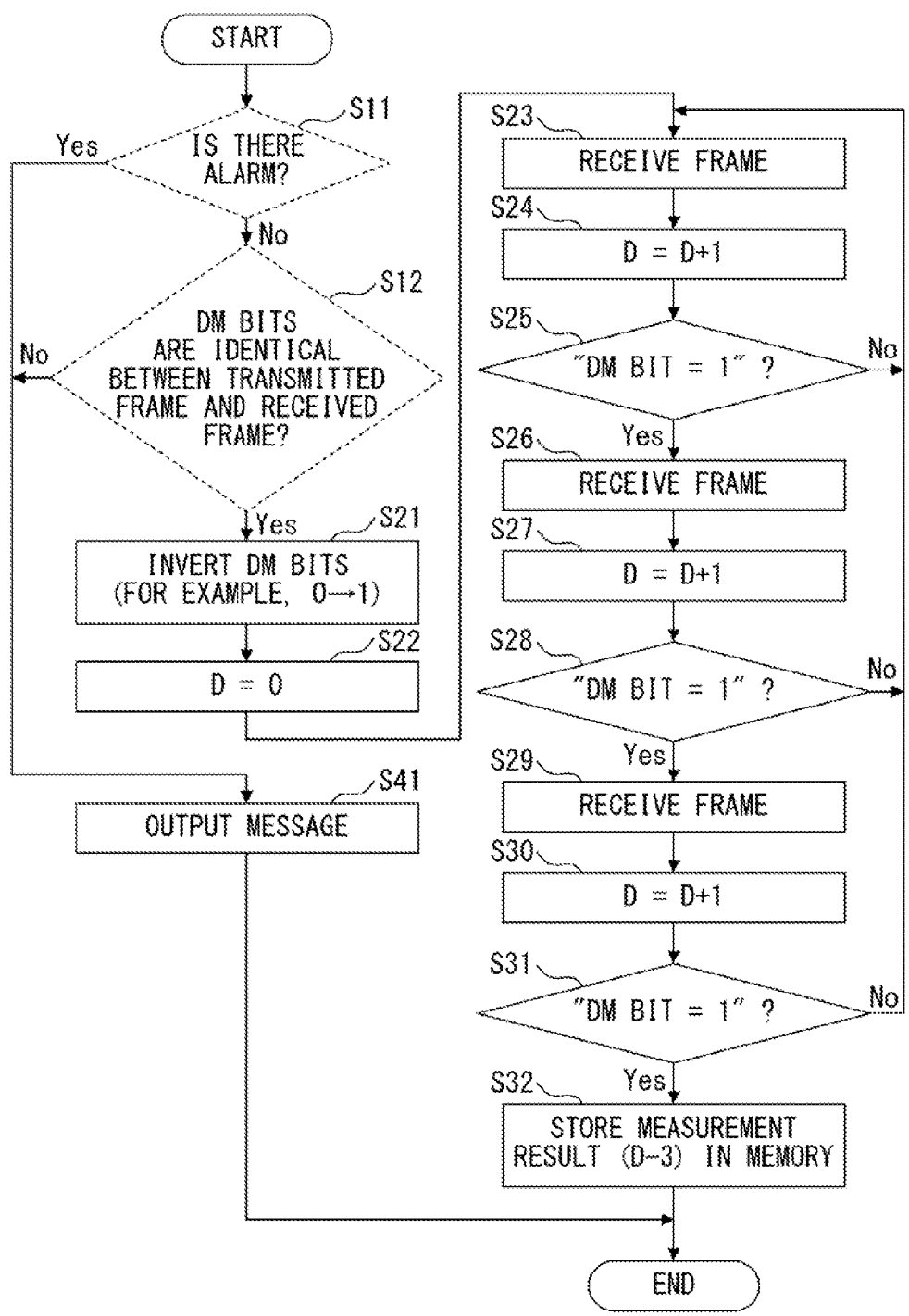
F I G. 10

TRANSMISSION DEVICE AND METHOD FOR MEASURING DELAY

CROSS-REFERENCE TO RELATED APPLICATION

This application is based upon and claims the benefit of priority of the prior Japanese Patent Application No. 2012-13809, filed on Jan. 26, 2012, the entire contents of which are incorporated herein by reference.

FIELD

The embodiments described herein are related to a transmission device used in a transmission system, and to a method for measuring transmission delay in a transmission system.

BACKGROUND

In an optical transmission system that transmits data with frames, transmission delay is measured between nodes in order to confirm the reliability of data transmission. It is desirable to perform this kind of transmission delay measurement while an optical transmission system is operating.

There is a method proposed as a technique for measuring transmission delay in optical transmission systems. According to this technique, the transmission device attaches time information to frames and transmits those frames, and the reception device decides the order of processing the frames according to the time information. Also, a propagation delay and transmission intervals are measured by using the time information attached to the frames, and further the guard time is calculated from the propagation delay so as to configure this guard time in each communication path, and thereby the frames are processed in the right order (Japanese Laid-open Patent Publication No. 2007-336191 for example).

However, in the conventional method described above, the transmission device and the reception device must be synchronized to each other in order to measure the transmission delay. That is to say, the times on the clocks in the transmission device and the reception device have to be synchronized to each other.

SUMMARY

According to an aspect of the embodiments, a transmission device that transmits a frame to a correspondent device and receives a frame from the correspondent device. The transmission device includes: a measurement unit configured to perform a delay measurement that measures a period of time from when a frame is transmitted to the correspondent device until when a corresponding frame is received from the correspondent device; and a delay decision unit configured to determine a transmission delay between the transmission device and the correspondent device based on a plurality of target measurement results obtained from a plurality of delay measurements except for at least a first delay measurement among delay measurements performed by the measurement unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a format of an OTN frame;
FIG. 3 explains how PM&TCM is used;
FIG. 10 is a flowchart illustrating a sequence of the delay measurement.

DESCRIPTION OF EMBODIMENTS

Figure 1A:
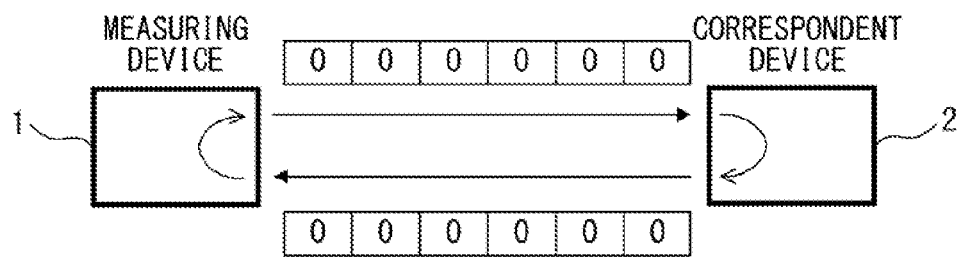
FIGS. 1A-1C illustrates a background art of a method for measuring delay.

An optical transmission system according to an embodiment of the present invention includes a first optical transmission device and a second optical transmission device. Between the first optical transmission device and the second optical transmission device are provided an optical transmission path for transmitting an optical signal from the first optical transmission device to the second optical transmission device, and an optical transmission path for transmitting an optical signal from the second optical transmission device to the first optical transmission device. On these optical transmission paths, one or a plurality of other optical transmission devices (including an optical repeater) may be provided. Between the first optical transmission device and the second optical transmission device, data and/or information is transmitted by using a frame. In the following description, the term "frame" may include a packet.

The first optical transmission device is capable of performing a delay measurement in which a transmission delay is measured between the first optical transmission device and the second optical transmission device. The transmission delay substantially corresponds to the propagation time of an optical signal on an optical transmission path. However, the transmission delay may include a processing time or the like in each optical transmission device.

The first optical transmission device transmits a frame to the second optical transmission device in the delay measurement. The second optical transmission device returns (i.e., loops back) specified information in the received frame to the first optical transmission device. The first optical transmission device measures the time elapsed between when the first optical transmission device transmitted the frame to the second optical transmission device and when that frame including the specified information has been returned from the second optical transmission device (i.e. the transmission delay).

As described above, the first optical transmission device is capable of measuring the transmission delay between the first optical transmission device and the second optical transmission device by measuring the time elapsed before a frame that was transmitted from the first optical transmission device to the second optical transmission device is retuned to the first optical transmission device. Thus, the first optical transmission device is capable of measuring the transmission delay between the first optical transmission device and the second optical transmission device without synchronization between the first and second optical transmission devices.

In the descriptions hereinbelow, the above optical transmission device that performs delay measurements (i.e., the first optical transmission device) may be referred to as a "measuring device". Also, an optical transmission device that loops back (i.e., the second optical transmission device), to a measuring device, a frame transmitted from that measuring device may be referred to as a "correspondent device".

In the explanations hereinbelow, an optical transmission system including a measuring device and a correspondent device is assumed to transmit frames in accordance with the OTN (Optical Transport Network) standard, although there are no particular limitations on the optical transmission system. The OTN standard is defined in ITU-T G.709/Y.1331. Note that a frame based on the OTN standard may be referred to as an "OTN frame" or just a "frame" in the explanations hereinbelow.

Figure 1B:
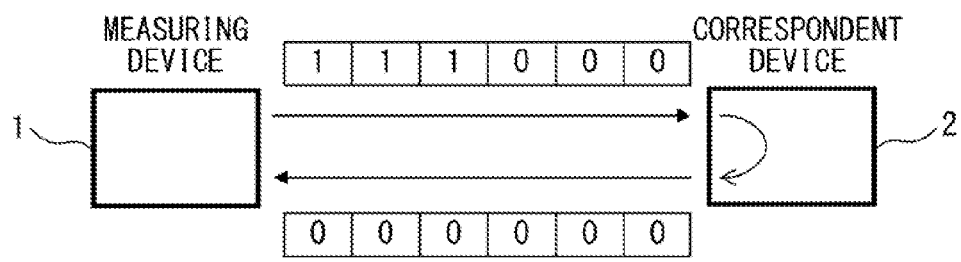
Figure 1C:
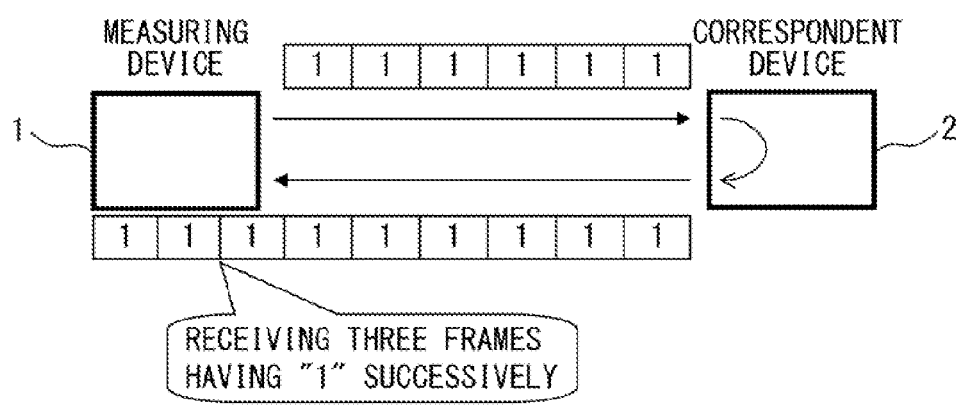

FIGS. 1A-1C illustrate a background art of a method for measuring delay in an optical transmission system. In the example illustrated in FIGS. 1A-1C, the optical transmission system includes a measuring device 1 and a correspondent device 2. The measuring device 1 transmits OTN frames to the correspondent device 2 at constant intervals. Similarly, the correspondent device 2 transmits OTN frames to the measuring device 1 at constant intervals. When the correspondent device 2 receives an OTN frame from the measuring device 1, the correspondent device 2 returns (i.e., loops back) specified information in the received frame to the measuring device 1.

Figure 2:
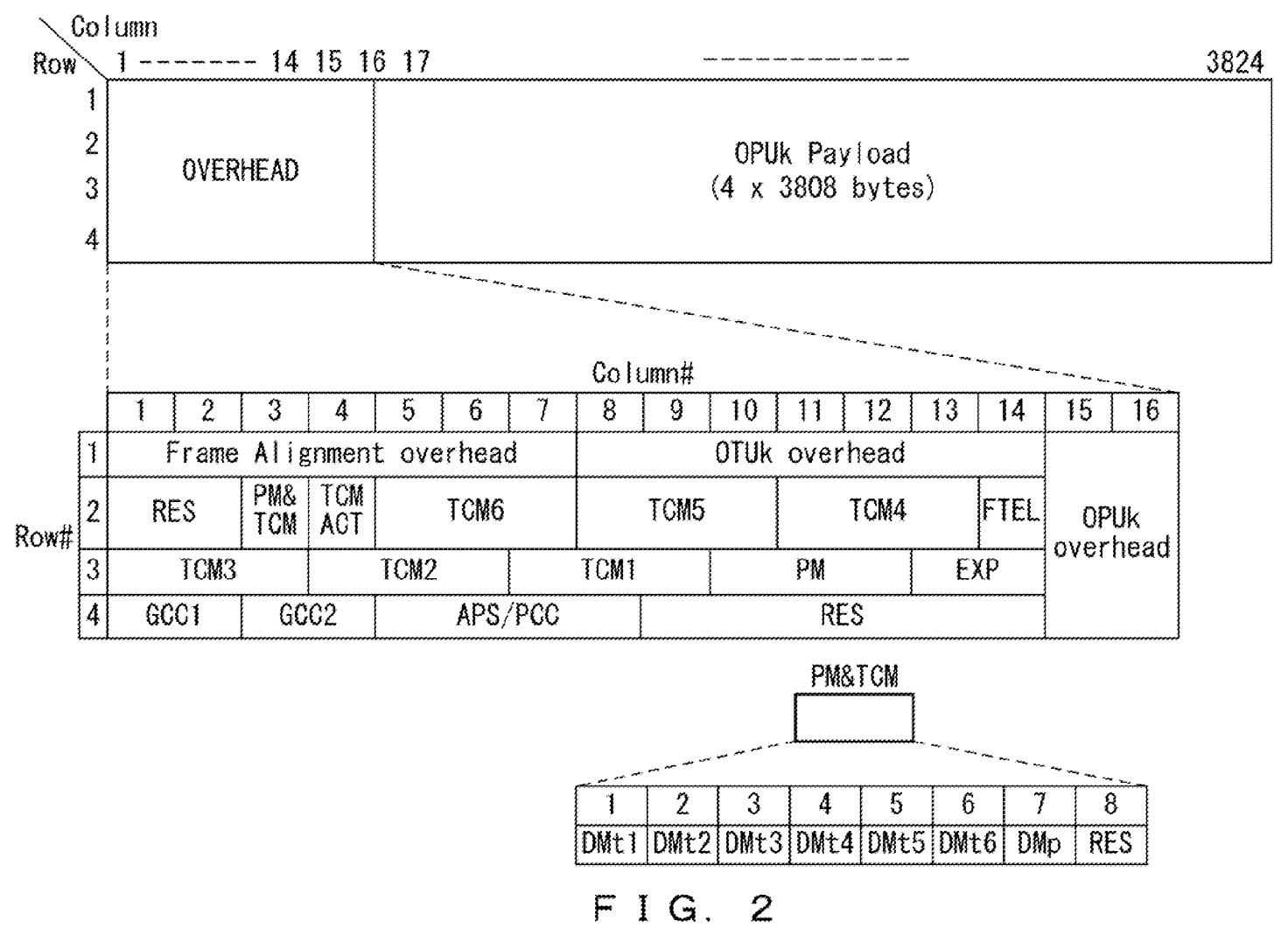

FIG. 2 illustrates the frame format of an OTN frame. An OTN frame has an overhead and OPUk payload as illustrated in FIG. 2. The overhead is of 4×16 bytes, and the OPUk payload is of 4×3808 bytes. Client data is contained in the OPUk payload. The OTN frame may include an error-correction code at the tail of the OPUk payload, although this configuration is not illustrated.

The overhead contains a frame alignment overhead, an OTUk overhead, an ODUk overhead, and an OPUk overhead. The OPUk frame is formed by adding the OPUk overhead to the OPUk payload. Also, an ODUk frame is formed by adding the ODUk overhead to the OPUk frame. The ODUk overhead is arranged over Row #2 through Row #4 and Column #1 through Column #14. Further, the OTUk overhead and the frame alignment overhead are added to the ODUk frame. Information on the respective abbreviations is as follows.
OTU: Optical channel Transport Unit
ODU: Optical channel Data Unit
OPU: Optical channel Payload Unit In OTN, it is possible to measure a transmission delay between optical transmission devices by using the PM&TCM in an ODUk overhead. As illustrated in FIG. 2, the PM&TCM is arranged in Row #2 and Column #3. The first through sixth bits of the PM&TCM are used as DMt1 through DMt6. The seventh bit of the PM&TCM is used as DMp. The eighth bit of the PM&TCM is reserved for future use.

Information on the respective abbreviations in FIG. 2 is as follows.
PM: Path Monitoring
TCM: Tandem Connection Monitoring
RES: Reserved for future international standardization
ACT: Activation/deactivation control channel
FTFL: Fault Type & Fault Location coordination channel
EXP: Experimental
GCC: General Communication Channel
APS: Automatic Protection Switching coordination channel
PCC: Protection Communication Control channel
DM: Delay Measurement FIG. 3 explains how PM&TCM is used. In the example illustrated in FIG. 3, optical transmission devices 3a through 3d are arranged sequentially along an optical path. The optical transmission device 3a performs delay measurements as a measuring device. Specifically, the optical transmission device 3a measures transmission delay between the optical transmission device 3a and each of the optical transmission devices 3b, 3c, and 3d. Note that path #1 is set between the optical transmission devices 3a and 3b, path #2 is set between optical transmission devices 3a and 3c, and path #3 is set between optical transmission devices 3a and 3d. The setup of paths is performed by, for example, a network management system (not illustrated) that manages the optical transmission system.

In this case, information related to path #1 is transmitted between the optical transmission devices 3a and 3b by, for example, TCM1 in the ODUk overhead. Information related to path #2 is transmitted between the optical transmission devices 3a and 3c by TCM2, and information related to path #3 is transmitted between optical transmission devices 3a and 3d by TCM3.

When transmission delay is to be measured between the optical transmission devices 3a and 3b in the above example, the optical transmission device 3a uses the DMt1 bit of PM&TCM. The optical transmission device 3a sets a specified value to the DMt1 bit and transmits the frame to the optical transmission device 3b. The optical transmission device 3b extracts the DMt1 bit from the received frame. Thereafter, the optical transmission device 3b writes the value of the DMt1 bit extracted from the received frame to the DMt1 bit of a frame to be transmitted to the optical transmission device 3a. In other words, the optical transmission device 3b returns to the optical transmission device 3a the DMt1 bit received from the optical transmission device 3a. The optical transmission device 3a detects the DMt1 bit returned from the optical transmission device 3b, and thereby measures the transmission delay between the optical transmission devices 3a and 3b. Note that returning one bit in PM&TCM (DMt1 bit in the above example) is referred to as "looping back" or "loopback" hereinafter.

When transmission delay is measured between the optical transmission devices 3a and 3c, the optical transmission device 3a uses a DMt2 bit. In this case, the optical transmission device 3b does not loop back the DMt2 bit. In other words, the DMt2 bit passes through the optical transmission device 3b. The optical transmission device 3c loops back the DMt2 bit. Accordingly, the optical transmission device 3a detects the DMt2 bit returned from the optical transmission device 3c, and thereby measures the transmission delay between the optical transmission devices 3a and 3c.

Similarly, when transmission delay is measured between the optical transmission devices 3a and 3d, the optical transmission device 3a uses a DMt3 bit. In this case, the optical transmission device 3b or 3c does not loop back the DMt3 bit. In other words, the DMt3 bit passes through the optical transmission devices 3b and 3c. The optical transmission device 3d loops back the DMt3 bit. Accordingly, the optical transmission device 3a detects the DMt3 bit retuned from the optical transmission device 3d, and thereby measures the transmission delay between the optical transmission devices 3a and 3d. It is also possible for the optical transmission device 3a to measure transmission delay between the optical transmission devices 3a and 3d by using a DMp bit when, for example, the optical transmission devices 3a and 3d are located at the edges of an OTN network.

As described above, the measuring device (the optical transmission device 3a) can measure transmission delay between the measuring device and an arbitrary optical transmission device by using DMt1 through DMt6 bits or the DMp bit of PM&TCM. Accordingly, the DMt1 through DMt6 bits or the DMp bit are also referred to as "DM (Delay Measurement) bits" hereinafter.

Again, FIGS. 1A-1C will be explained. Each optical transmission device (including the measuring device 1 and the correspondent device 2) loops back a DM bit when delay measurements are not being performed, as illustrated in FIG. 1A. When, for example, the default value of the DM bit is zero, the DM bits of respective frames transmitted between the measuring device 1 and the correspondent device 2 (DM bits used for measuring delay between the measuring device 1 and the correspondent device 2) are all zero.

The measuring device 1 changes the value of DM bits when the measuring device 1 starts a delay measurement. In this case, as illustrated in FIG. 1A, since the DM bits at the start of the delay measurement are "0", the measuring device 1 changes the DM bits from "0" to "1". Thereafter, the measuring device 1 transmits frames having "DM bit=1". Also, the measuring device 1 does not loop back the DM bits during the delay measurement. Meanwhile, the correspondent device 2 loops back the DM bits even during the delay measurement. When the DM bits are "1" at the start of a delay measurement, the measuring device 1 changes the DM bits from "1" to "0".

The measuring device 1 continuously transmits frames having "DM bit=1" at constant intervals. The correspondent device 2 loops back "DM bit=1", which was received from the measuring device 1. Thus, the measuring device 1 receives frames having "DM bit=1" from the correspondent device 2 when a certain time period has elapsed, as illustrated in FIG. 1C. Thereby, the measuring device 1 can measure a transmission delay between the measuring device 1 and the correspondent device 2 by measuring a period of time from when a start of the transmission of frames having "DM bit=1" until when the reception of frames having "DM bit=1" from the correspondent device 2. In this optical transmission system, frames are transmitted at constant intervals. Thus, the measuring device 1 can measure a transmission delay by counting frames received during the above period of time.

However, the measuring device 1 may terminate a delay measurement when the measuring device 1 has received a specified number of frames having "DM bit=1" successively. In the example illustrated in FIG. 1C, the measuring device 1 measures a period of time between when the measuring device 1 started transmitting frames having "DM bit=1" and when the measuring device 1 received three frames having "DM bit=1" successively. In this case, the delay time of the transmission path is calculated based on a value obtained by subtracting 3 from the number of frames received during this period of time. The method related to the delay measurement illustrated in FIGS. 1A-1C is described in ITU-T G.798.

In an embodiment of the present invention, the measuring device 1 performs the above delay measurement a plurality of times, which will be explained later in detail. In this example, the measuring device 1 changes the values of DM bits when the measuring device 1 performs a new delay measurement. For example, "1" is used as the DM bits in the delay measurement illustrated in FIGS. 1A-1C. In such a case, the measuring device 1 changes DM bits from "1" to "0" when the measuring device 1 stars a next delay measurement. In other words, the measuring device 1 starts the next delay measurement by changing the DM bits from "1" to "0". Thereafter, when the delay measurements are conducted repeatedly, "0" and "1" are set as the DM bits alternately.

Figure 4A:
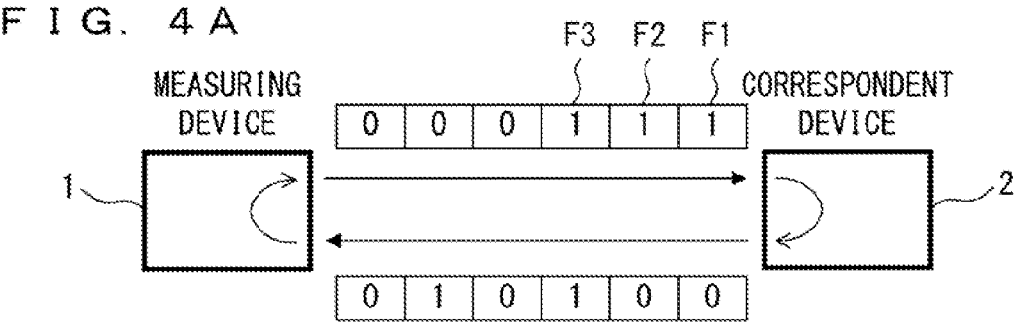
FIGS. 4A-4C explain a problem in the delay measurement illustrated in FIGS. 1A-1C.
Figure 4B:
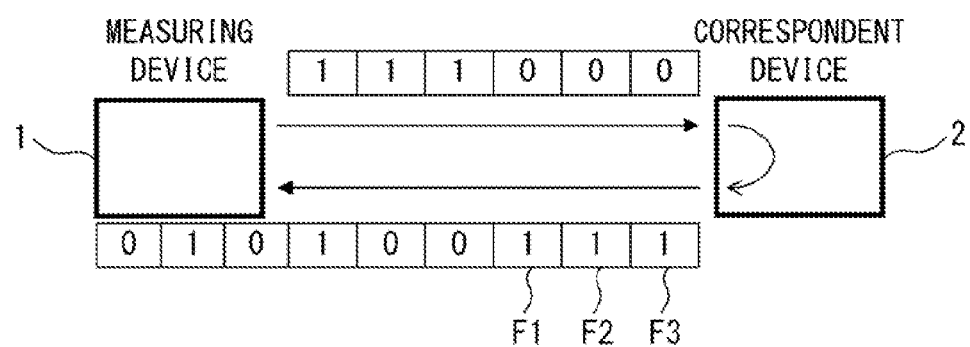
Figure 4C:
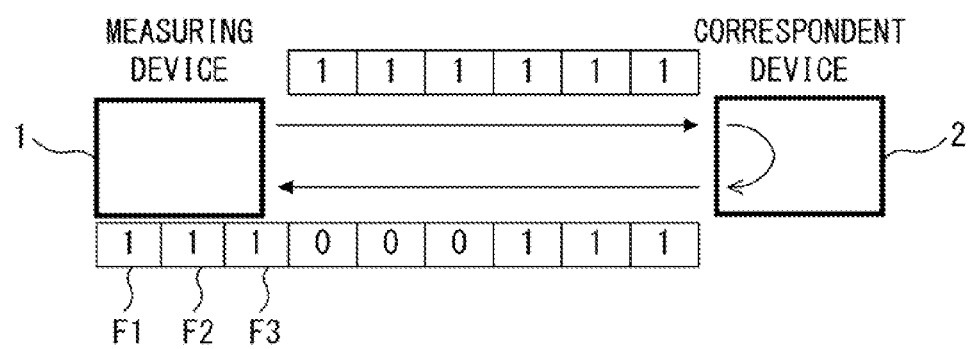

FIGS. 4A-4C illustrate a problem in the above delay measurement. FIG. 4A illustrates a status of DM bits between the measuring device 1 and the correspondent device 2 when delay measurements are not being performed. As described above, when delay measurements are not being performed, the measuring device 1 and the correspondent device 2 loop back respective DM bits. Due to this, when, for example, a DM bit is changed (or inverted) on the optical path for some reason, the inverted DM bit is left on the optical path between the measuring device 1 and the correspondent device 2. In the example illustrated in FIG. 4A, the DM bits of three successive frames F1 through F3 on the optical path have been inverted from "0" to "1".

Thereafter, the measuring device 1 changes DM bits from "0" to "1" so as to start a delay measurement. Then, as illustrated in FIG. 4B, transmission of frames having "DM bit=1" begins.

When a certain time has elapsed from the state illustrated in FIG. 4B, the measuring device 1 receives frames F1 through F3 as illustrated in FIG. 4C. In this example, the respective DM bits of frames F1 through F3 are "1". As a consequence, the measuring device 1 recognizes, as the transmission delay, the time elapsed between when the measuring device 1 started the transmission of frames having "DM bit=1" and when the measuring device 1 received frames F1 through F3. In such a case, a period of time shorter than the actual transmission delay time is detected.

Figure 5:
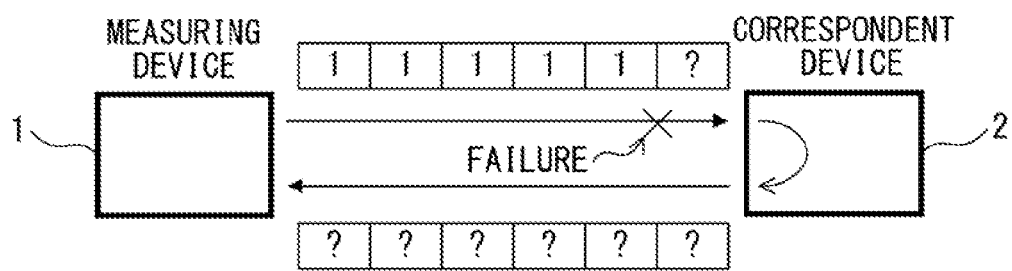
FIG. 5 explains another problem in the delay measurement illustrated in FIGS. 1A-1C.

FIG. 5 explains another problem of the above delay measurement. In the example illustrated in FIG. 5, the transmission path between the measuring device 1 and the correspondent device 2 involves a failure. Due to this failure, even if the measuring device 1 transmits frames having "DM bit=1", the values of the DM bits are variable in frames that the measuring device 1 receives. In such a case, the measuring device 1 fails to measure a transmission delay, or detects an inaccurate period of time.

As described above, the method explained by referring to FIGS. 1A-1C sometimes fails to measure transmission delay properly. Hereinafter, configurations and methods for solving the above problems will be explained.

First Embodiment

Figure 6:
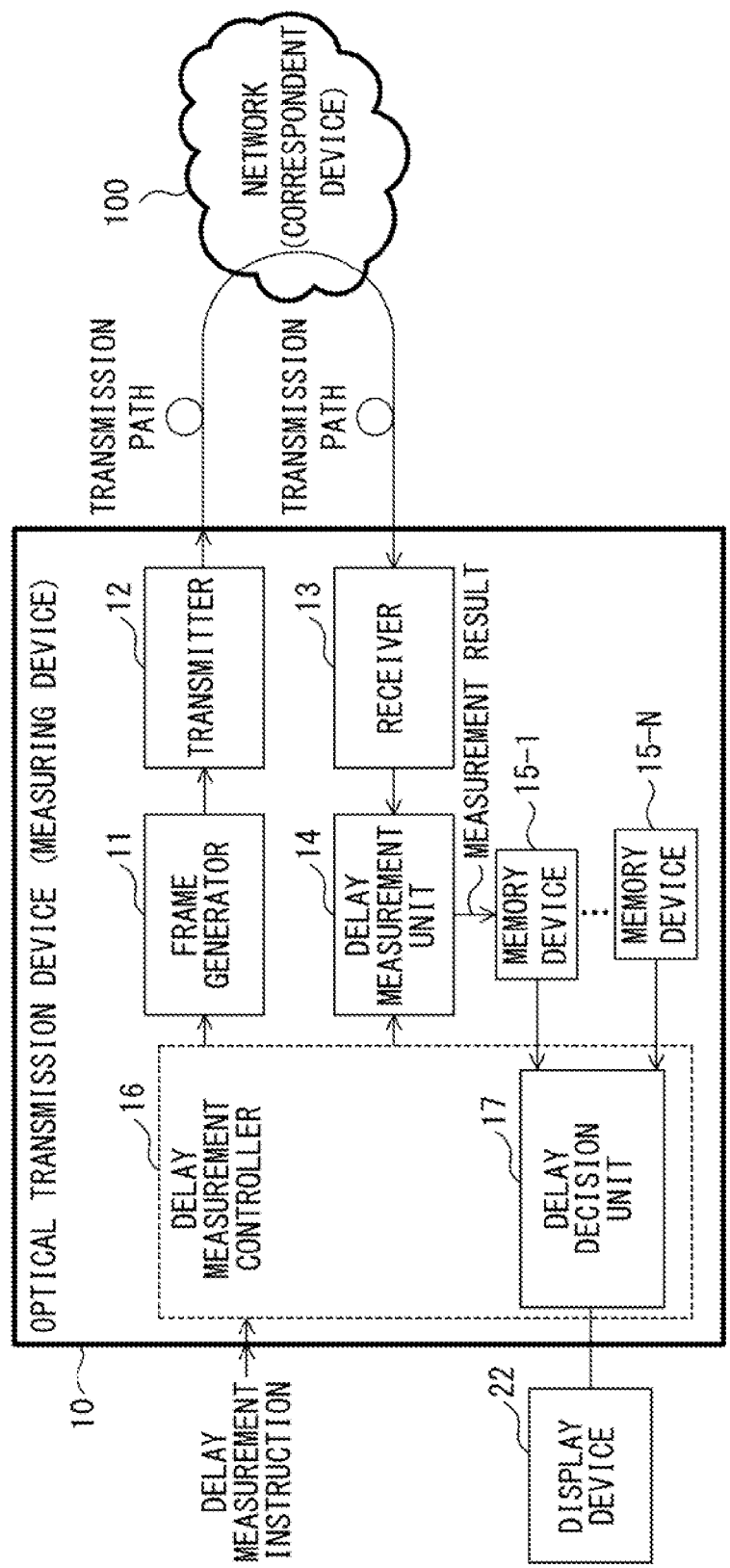
FIG. 6 illustrates a configuration of an optical transmission device according to a first embodiment.

FIG. 6 illustrates a configuration of an optical transmission device according to a first embodiment. An optical transmission device 10 of the first embodiment includes a frame generator 11, a transmitter 12, a receiver 13, a delay measurement unit 14, memory devices 15-1 through 15-N, and a delay measurement controller 16.

The frame generator 11 generates OTN frames illustrated in FIG. 2. For this generation, the frame generator 11 sets DM bits under the control of the delay measurement controller 16. In an OTN frame, the DM bit corresponds to DMt1 bit through DMt6 bit or a DMp bit in the ODUk overhead. However, when the optical transmission device 10 does not operate as a measuring device, the frame generator 11 sets the values of DM bits in received frames to DM bits of frames to be transmitted. In other words, loopback of DM bits is performed. Note that the frame generator 11 may be implemented by a hardware circuit. However, the frame generator 11 may be implemented by executing a software program.

The transmitter 12 sequentially outputs frames generated by the frame generator 11 to a network 100 at constant intervals. For this transmission, the transmitter 12 may convert the frames into, for example, data streams, and transmits optical signals carrying the data streams to another optical transmission device provided in the network 100. Note that the transmitter 12 includes an optical modulator or the like.

The receiver 13 receives frames via the network 100. The receiver 13 may demodulate the received optical signals to recover the data streams, and may reconfigure the frames from the data streams.

The delay measurement unit 14 measures a delay time on the optical transmission path between the optical transmission device 10 and the correspondent device by using DM bits in frames received by the receiver 13. The correspondent device is an optical transmission device connected to the network 100. The delay measurement unit 14 stores the measuring result in the memory device. The optical transmission device 10 performs delay measurement a plurality of times, which will be explained later in detail. Accordingly, the delay measurement unit 14 respectively stores, in the memory devices 15-1 through 15-N, a plurality of measurement results obtained from delay measurements performed a plurality of times. The delay measurement unit 14 may be implemented by a hardware circuit. However, the delay measurement unit 14 may be implemented by executing a software program.

The memory devices 15-1 through 15-N store respective measurement results obtained by the delay measurement unit 14. In this example, the memory devices 15-1 through 15-N are memory areas in one memory element. Also, the memory devices 15-1 through 15-N are implemented by, for example, semiconductor memory.

The delay measurement controller 16 controls operations related to delay measurements by the optical transmission device 10. Also, the delay measurement controller 16 includes a delay decision unit 17. The delay decision unit determines a transmission delay between the optical transmission device 10 and the correspondent device based on a plurality of measurement results stored in the memory devices 15-1 through 15-N. The delay measurement controller 16 is implemented by, for example, a processor that executes a software program.

The optical transmission device 10 illustrated in FIG. 6 starts a delay measurement when the optical transmission device 10 receives a delay measurement instruction. The delay measurement instruction is given from, for example, a user (or administrator of the network). Also, the delay measurement instruction can specify a correspondent device from among a plurality of optical transmission devices connected to the network 100. For example, in FIG. 3, a delay measurement instruction given to the optical transmission device 3$a$ can specify the optical transmission device 3$b$, 3$c$, or 3$d$ as an correspondent device.

Upon receiving the delay measurement instruction, the delay measurement controller 16 makes the frame generator 11 and the delay measurement unit 14 perform the delay measurement N times. N is an integer equal to or greater than three. Measurement results 1 through N obtained by the delay measurement unit 14 are stored in the memory devices 15-1 through 15-N, respectively. The delay decision unit 17 determines the transmission delay on the path between the optical transmission device 10 and the correspondent device based on measurement results 1 through N stored in the memory devices 15-1 through 15-N.

However, the delay decision unit 17 determines the transmission delay between the optical transmission device 10 and the correspondent device based on a plurality of measurement results other than the first measurement result obtained by N delay measurements performed by the delay measurement unit 14. It is assumed, for example, that the delay measurement unit 14 has performed delay measurement three times, and the corresponding measurement results have been stored in the memory devices 15-1 through 15-3. In such a case, the delay decision unit 17 does not use the measurement result obtained from the first delay measurement, and determines the transmission delay between the optical transmission device 10 and the correspondent device based on measurement results 2 and 3, obtained from the second and third delay measurements.

The delay decision unit 17 may determine the delay time based on a plurality of the measurement results of unignored delay measurements (for example, delay measurements other than the first delay measurement) when variation between the plurality of measurement results obtained from the unignored delay measurements is smaller than a specified threshold. Hereinafter, explanations will be given for a way of determining a transmission delay based on measurement results 2 through N when measurement results 1 through N are stored in the memory devices 15-1 through 15-N.

The delay decision unit 17 calculates variations between measurement results 2 through N (the differences between the measurement results in this example). It is assumed herein that the transmission delay is measured by the number of frames. In the case, when, for example, the difference between the greatest value and the smallest value among measurement results 2 through N is smaller than five frames, the transmission delay is determined based on measurement results 2 through N.

The delay decision unit 17 outputs one of, for example, (1) through (5) below as the transmission delay between the optical transmission device 10 and the correspondent device.
(1) Measurement result obtained first among measurement results 2 through N (i.e. measurement result 2)
(2) Measurement result obtained last among measurement results 2 through N (i.e. measurement result N)
(3) Average among measurement results 2 through N
(4) Smallest value among measurement results 2 through N
(5) Greatest value among measurement results 2 through N Note that a display device 22 may be connected to the optical transmission device 10. In such a case, a measurement result obtained by the delay decision unit 17 (i.e., a transmission delay) is displayed on the display device 22.

As described above, according to the first embodiment, delay measurement is performed a plurality of times, and the transmission delay is determined based on a plurality of measurement results of unignored delay measurements, obtained by ignoring at least the first delay measurement among the delay measurements performed a plurality of times. As illustrated in FIG. 4A, not all DM bits have the same value in frames on the optical transmission path between the measuring device and the correspondent device at the start of the first delay measurement. Accordingly, as illustrated in FIG. 4C, the first delay measurement sometimes fails to measure transmission delay properly. Thus, the delay decision unit 17 calculates transmission delay while ignoring at least the measurement result obtained from the first delay measurement. After a delay measurement has been performed (in particular, immediately after delay measurement), all DM bits have the same value in respective frames on the transmission path between the measuring device and the correspondent device, as illustrated in FIG. 1C. When the delay measurement starts under this condition, improper measurements illustrated in FIGS. 4A-4C can be prevented. Thus, the first embodiment can measure a transmission delay properly.

Further, according to the first embodiment, transmission delay is determined based on a plurality of measurement results. This improves the reliability of delay measurements.

Although the result of the first delay measurement is ignored in determination of transmission delay in the above example, it is also possible to ignore the results of first plural delay measurements. For example, when, for example, the results of the first two delay measurements are ignored, the delay decision unit 17 determines transmission delay based on measurement results 3 through N.

Second Embodiment

Figure 7:
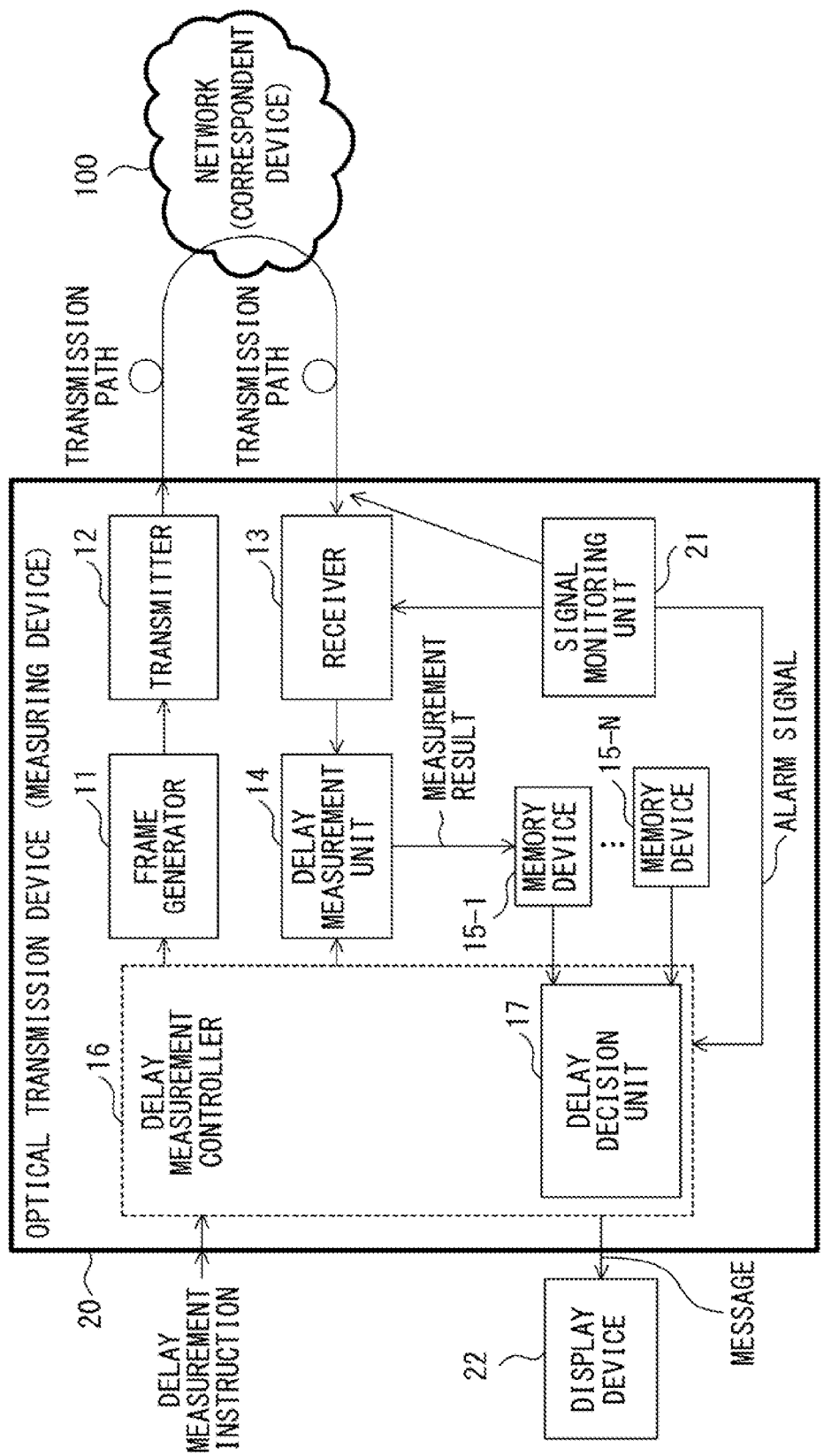
FIG. 7 illustrates a configuration of an optical transmission device according to a second embodiment.

FIG. 7 illustrates a configuration of an optical transmission device according to a second embodiment. An optical transmission device 20 according to the second embodiment includes the frame generator 11, the transmitter 12, the receiver 13, the delay measurement unit 14, the memory devices 15-1 through 15-N, the delay measurement controller 16, and a signal monitoring unit 21. The configurations and operations of the frame generator 11, the transmitter 12, the receiver 13, the delay measurement unit 14, the memory devices 15-1 through 15-N, and the delay measurement controller 16 are substantially the same as those in the first embodiment, and thus the explanations thereof will be omitted. Note that the display device 22 is connected to the optical transmission device 20.

The signal monitoring unit 21 monitors the status of optical transmission paths. Specifically, the signal monitoring unit 21 monitors optical signal received from the network 100, and data reproduced from the received optical signal. For example, the signal monitoring unit 21 monitors optical level (or optical power) of received optical signal. When the optical level of a received optical signal is lower than a specified threshold level, the signal monitoring unit 21 outputs an alarm signal. The signal monitoring unit 21 may also monitor the optical signal-to-noise ratio (OSNR) of received optical signal. In such a case, when OSNR has become lower than a specified threshold, the signal monitoring unit 21 outputs an alarm signal. Further, the signal monitoring unit 21 may monitor the error rate of data reproduced by the receiver 13. In such a case, when an error rate has become worse than a specified threshold, the signal monitoring unit 21 outputs an alarm signal.

When the delay measurement controller 16 receives an alarm signal from the signal monitoring unit 21, the delay measurement controller 16 determines that the reliability of the optical transmission path is low. Thus, the delay measurement controller 16 does not start the delay measurement when the delay measurement controller 16 has received the alarm signal before starting the delay measurement. Also, when the delay measurement controller 16 receives the alarm signal during a delay measurement, the delay measurement controller 16 terminates the delay measurement. In such a case, the delay measurement controller 16 does not output measurement results. Thus, according to the second embodiment, when a failure has occurred on an optical transmission path, for example, as illustrated in FIG. 5, the signal monitoring unit 21 outputs an alarm signal, and the delay measurement controller 16 does not perform delay measurement, or stops it. As a result of this, measurement results of low reliability are not output.

When the delay measurement controller 16 receives an alarm signal, the delay measurement controller 16 displays on the display device 22 a message expressing deterioration of transmission characteristics. In such a case, a message of, for example, "delay measurement is halted due to low transmission characteristics" is displayed on the display device 22.

Third Embodiment

Figure 8:
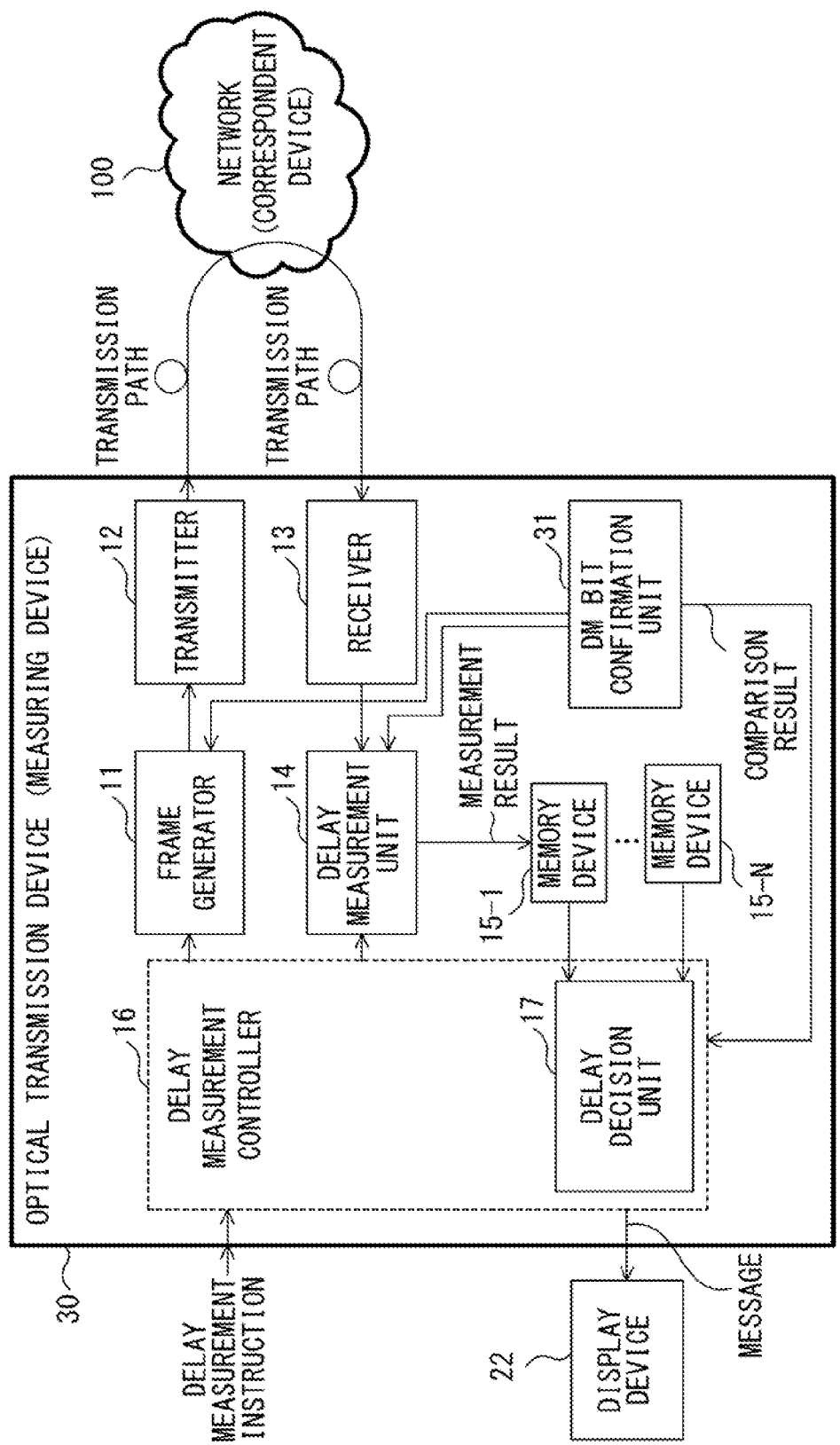
FIG. 8 illustrates a configuration of an optical transmission device according to a third embodiment.

FIG. 8 illustrates a configuration of an optical transmission device 30 according to a third embodiment. An optical transmission device according to the third embodiment includes the frame generator 11, the transmitter 12, the receiver 13, the delay measurement unit 14, the memory devices 15-1 through 15-N, the delay measurement controller 16, and a DM bit confirmation unit 31. The configurations and operations of the frame generator 11, the transmitter 12, the receiver 13, the delay measurement unit 14, the memory devices 15-1 through 15-N, and the delay measurement controller 16 are substantially the same as those in the first embodiment, and thus the explanations thereof will be omitted. Also, similarly to the second embodiment, the display device 22 is connected to the optical transmission device 30.

As explained above by referring to FIGS. 1A-1C and 4A-4C, a proper delay time is measured when all DM bits have the same value in respective frames on the transmission path between the measuring device and the correspondent device at the start of a delay measurement. In other words, when DM bits are variable in frames on the transmission path between the measuring device and the correspondent device at the start of a delay measurement, an improper delay time is sometimes detected.

Accordingly, the DM bit confirmation unit 31 compares a DM bit in a frame to be transmitted by the transmitter 12 and a DM bit in a frame received by the receiver 13. Then, the DM bit confirmation unit 31 reports the comparison result to the delay measurement controller 16. Note that the DM bit confirmation unit 31 may compare DM bits in a plurality of frames to be transmitted and DM bits in a plurality of corresponding received frames.

When the DM bits correspond to each other between the frame (s) to be transmitted and the received frame (s), the delay measurement controller 16 starts a delay measurement. When the DM bits are different from each other between the frame (s) to be transmitted and the received frame (s), the delay measurement controller 16 outputs a message to the display device 22 without performing delay measurements. In such a case, a message of, for example, "delay measurement is not performed" is displayed on the display device 22.

According to the third embodiment, when DM bits are variable in frames on the optical transmission path between the measuring device and the correspondent device, delay measurement is not performed. Thus, the reliability of delay measurements is improved.

The second and third embodiments may be combined. Specifically, the optical transmission device may include both the signal monitoring unit 21 and the DM bit confirmation unit 31. In such a case, the optical transmission device (measuring device) performs a delay measurement when the characteristics of an optical transmission path are better than a specified threshold and DM bits correspond to each other between transmitted frame and received frame.

<Flowchart>

Figure 9:
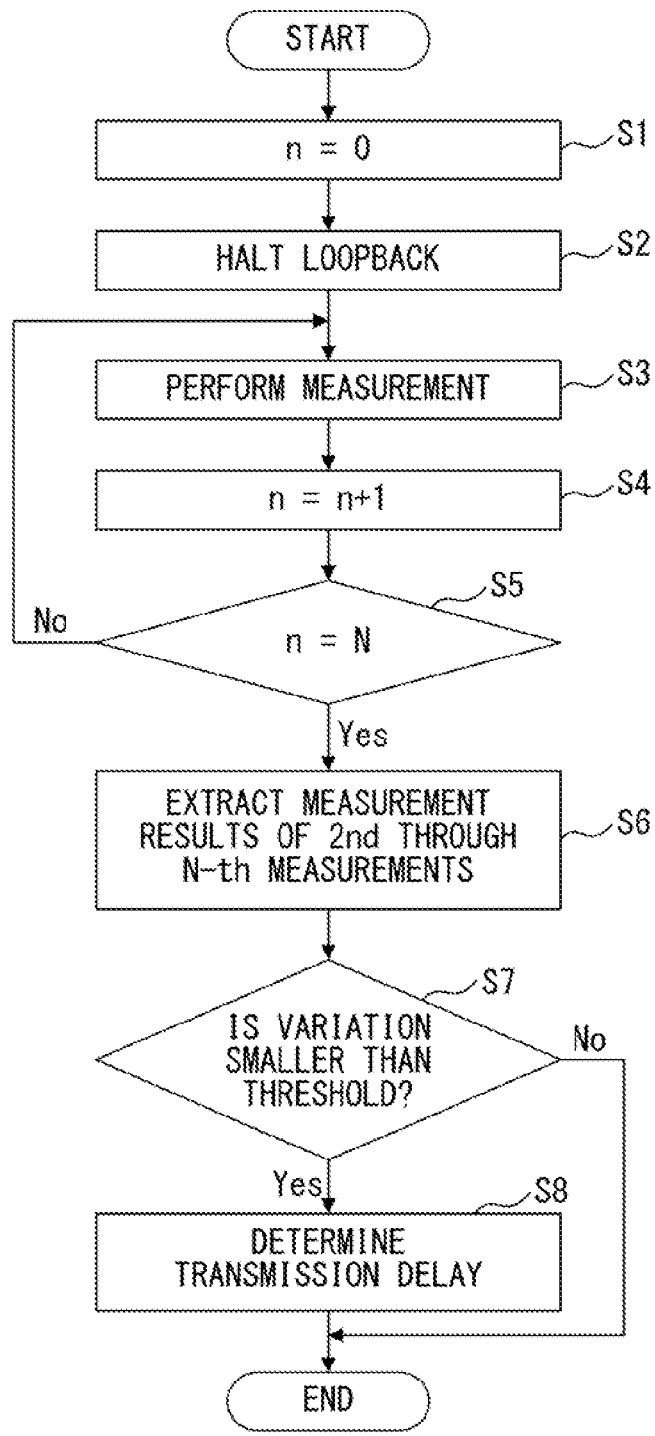
FIG. 9 is a flowchart illustrating a method for measuring delay according to the embodiment.

FIG. 9 is a flowchart illustrating a method for measuring delay according to the embodiments of the present invention. The processes of this flowchart can be applied to the first through third embodiments. The processes of this flowchart are executed by the optical transmission devices 10, 20, or 30 when the delay measurement instruction is given.

In S1, the delay measurement controller 16 initializes a variable n for counting the number of times delay measurement is performed into zero. In S2, the delay measurement controller 16 halts the loopback operation of DM bits. Note that before a delay measurement instruction is given, the delay measurement controller 16 obtains the value in the DM bit of a received frame, and gives the value to the frame generator 11. The frame generator 11 sets the value given from the delay measurement controller 16 to the DM bit in a frame to be transmitted. Thereby, the loopback of DM bits is realized. By contrast, when the delay measurement instruction is given, the delay measurement controller 16 gives to the frame generator 11 an instruction to validate the DM bit. Then, the frame generator 11 generates frames having "DM bit=default value" until the inversion of the DM bits is performed. The inversion of the DM bits will be explained later. In this example, the default value of the DM bit is "0".

In S3, the frame generator 11 and the delay measurement unit 14 perform a delay measurement. The delay measurement in S3 will be explained in detail later by referring to FIG. 10.

When the delay measurement in S3 is terminated, the delay measurement controller 16 increments the variable n in S4. In S5, the delay measurement controller 16 determines whether or not the variable n is equal to N. In other words, the delay measurement controller 16 determines whether or not the delay measurement in S3 has been performed N times. When the delay measurement in S3 has been performed N times, the process of the delay measurement controller 16 proceeds to S6. Note that N is an integer equal to or greater than three, and is a specified in advance.

The measurement results obtained from the delay measurement in S3 are stored in memory. Specifically, measurement results 1 through N obtained by performing delay measurement in S3 N times are stored in the memory devices 15-1 through 15-N.

In S6, the delay measurement controller 16 extracts a plurality of measurement results from among measurement results 1 through N stored in the memory devices 15-1 through 15-N, except for the measurement result obtained by the first measurement. In the example illustrated in FIG. 9, measurement results 2 through N are extracted while first measurement result 1 is ignored. Although one measurement result obtained by the first measurement is ignored in the example illustrated in FIG. 9, a plurality of measurement results obtained first may be ignored.

In S7, the delay decision unit 17 of the delay measurement controller 16 determines whether or not the variation between the extracted plurality of measurement results (measurement results 2 through N in FIG. 9) is smaller than a specified threshold. When the variation between measurement results 2 through N is smaller than the threshold, the delay decision unit 17 determines a transmission delay based on measurement results 2 through N in S8. The decision unit outputs one of (1) through (5) described above as a transmission delay. When the variation between measurement results 2 through N is equal to or greater than the threshold, the delay decision unit 17 outputs a corresponding message to the display device 22, and terminates the process without determining transmission delay.

FIG. 10 is a flowchart illustrating a sequence in a delay measurement. The process of the flowchart illustrated in FIG. 10 corresponds to S3 in FIG. 9. Thus, the optical transmission device performs the process of the flowchart illustrated in FIG. 10 N times in order to determine a transmission delay.

In S11, the delay measurement controller 16 makes the signal monitoring unit 21 monitor the status of the optical transmission path. The signal monitoring unit 21 monitors the status of the optical transmission path in accordance with an instruction from the delay measurement controller 16. The signal monitoring unit 21 monitors, for example, the optical level or the OSNR of received optical signal. When the status of the optical transmission path have deteriorated, the signal monitoring unit 21 generates an alarm signal. When an alarm signal is not generated in S11, the process of the delay measurement controller 16 proceeds to S12.

In S12, the delay measurement controller 16 makes the DM bit confirmation unit 31 confirm the DM bits. The DM bit confirmation unit 31 compares the DM bits between the transmitted frame and the received frame in accordance with an instruction from the delay measurement controller 16. The comparison result is reported to the delay measurement controller 16. When the DM bits are identical between the transmitted frame and the received frame, the process of the delay measurement controller 16 proceeds to S21.

Note that a method for measuring delay according to the embodiments does not have to include S11 and/or S12. For example, the optical transmission device 10 illustrated in FIG. 6 skips S11 and S12. The optical transmission device 20 illustrated in FIG. 7 skips S12. The optical transmission device 30 illustrated in FIG. 8 skips S11. The method for measuring delay according to the embodiments may execute both S11 and S12.

In S21, the frame generator 11 changes (or inverts) DM bits. Specifically, when the DM bit of an immediately previous frame is "0", the frame generator 11 changes the DM bits of subsequent frames to "1". Similarly, when the DM bit of an immediately previous frame is "1", the frame generator 11 changes the DM bits of subsequent frames to "0". Hereinafter, it is assumed that DM bits are changed from "0" to "1". Then, the delay measurement unit 14 initializes a variable D for counting received frames into "0" in S22.

In S23, the receiver 13 receives a frame from the network 100, and the delay measurement unit 14 obtains and analyzes the overhead of the received frame. Thereafter, the delay measurement unit 14 increments the variable D in S24. Further, the delay measurement unit 14 determines, in S25, whether or not the DM bit of the received frame indicates a value that has been changed in S21. For example, when the DM bits have been changed from "0" to "1" in S21, the delay measurement unit 14 determines whether the DM bit of the received frame is "1". When the DM bit of the received frame is not "1", the process of the optical transmission device returns to S23. In other words, the processes from S23 through S25 are repeated until a frame having "DM bit=1" is received. During this repeat, the variable D is incremented by one each time S23 through S25 are executed.

When "DM bit=1" is detected in S25, the delay measurement unit 14 executes S26 through S28. S26 through S28 are substantially the same as S23 through S25. In other words, the execution of S26 through S28 increments the variable D by one. Similarly, when "DM bit=1" is detected in S28, the delay measurement unit 14 executes S29 through S31. S29 through S31 are also substantially the same as S23 through S25. Accordingly, the execution of S29 through S31 increments the variable D by one.

As described above, when the optical transmission device receives three successive frames having "DM bit=1", the determination results are "Yes" in S25, S28, and S31, and the process of the delay measurement unit 14 proceeds to S32. At this point of time, the variable D represents the number of frames received by the optical transmission device while S21 through S31 are being executed.

In S32, the delay measurement unit 14 stores "D−3" in a corresponding memory device as a result of delay measurements. For example, the measurement result 1, obtained from the first delay measurement, is stored in the memory device 15-1, and the measurement result N, obtained from the N-th delay measurement, is stored in the memory device 15-N. For this storing, the delay measurement unit 14 may convert the measurement results, which are expressed by the numbers of frames, into time, and thereafter store the results in memory devices.

FIG. 10 illustrates a case where DM bits are changed from "0" to "1" in S21 and "DM bit=1" is detected in S25, S28, and S31. By contrast, when DM bits are changed from "1" to "0" in S21, "DM bit=0" is detected in S25, S28, and S31.

For example, when "DM bit=1" is used in the first delay measurement, "DM bit=0" obtained by the bit inversion in S21 is used in the second delay measurement. Accordingly, "DM bit=0" is detected in S25, S28, and S31 in the second delay measurement. Thereafter, "DM bit=0" and "DM bit=1" are used alternately in a similar manner.

When an alarm signal is generated by the signal monitoring unit 21 (Yes in S11), the delay measurement controller 16 displays a corresponding message on the display device 22 in S41. Also, when the DM bits are not identical between the transmitted frame and the received frame (No in S12), the delay measurement controller 16 displays a corresponding message on the display device 22 in S41.

In the above examples, the number of frames is counted until three frames having "DM bit=value after bit inversion" are received successively. However, the present invention is not limited to this manner. For example, the delay measurement unit 14 may count the number of frames until a first frame having "DM bit=value after bit inversion" is received.

Another Embodiment

In the above embodiments including the first through third embodiments, at least the measurement result obtained first among a plurality of measurement results is discarded without being used for the determination of transmission delay. By contrast, another embodiment described herein uses the measurement result obtained first among a plurality of measurement results for the determination of transmission delay.

Figure 11:
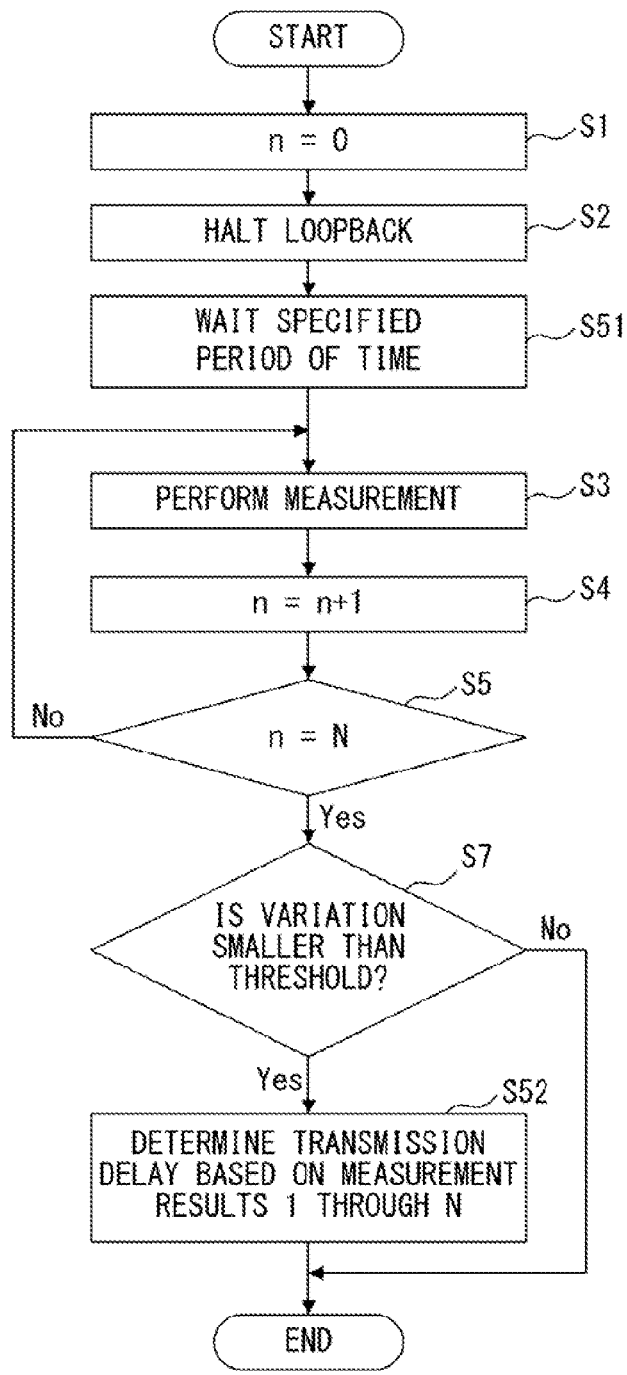
FIG. 11 is a flowchart illustrating a method for measuring delay according to another embodiment.

FIG. 11 is a flowchart illustrating a method for measuring delay according to the other embodiment. S1, S2, S3 through S5, and S7 are substantially the same as those in FIG. 9. Accordingly, explanations of these processes will be omitted. However, N is an integer equal to or greater than 2 in the flowchart illustrated in FIG. 11.

In S51, before starting a delay measurement, the delay measurement controller 16 waits until a specified period of time elapses while refraining from performing loopback. As the specified period of time, for example, a time longer than a transmission delay time estimated based on the distance between the measuring device and the correspondent device is used. When the above specified period of time has elapsed, the delay measurement controller 16 instructs the frame generator 11 and the delay measurement unit 14 to start the delay measurement. In response to this instruction, the frame generator 11 and the delay measurement unit 14 perform the delay measurement N times.

While loopback operation is not performed, the DM bit of each frame generated by the frame generator 11 is kept to a fixed value. Accordingly, at a time point when the specified period of time in S51 has elapsed, all the DM bits of the respective frames have the same value on the optical transmission path between the measuring device and the correspondent device. In other words, execution of S51 prevents the problem illustrated in FIGS. 4A-4C, i.e., the situation where "DM bits of respective frames are variable on the optical transmission path between the measuring device and the correspondent device". Thereafter, the delay measurement starts.

In S52, the delay measurement controller 16 determines transmission delay based on measurement results 1 through N stored in the memory devices 15-1 through 15-N. In the embodiment illustrated in FIG. 11, the problem illustrated in FIGS. 4A-4C is prevented as described above. In other words, the measurement result 1, obtained from the first delay measurement, is also highly reliable, thus the measurement result 1 can be used for determining transmission delay. Accordingly, the delay decision unit 17 determines transmission delay based on measurement results 1 through N. Note that FIG. 9 and FIG. 11 are substantially the same in the method of determining transmission delay based on a plurality of measurement results.

Although the first through third embodiments and the embodiment illustrated in FIG. 11 are applied to an optical transmission system that transmits OTN frames, the present invention is not limited to this configuration. In other words, the optical transmission device and the method for measuring delay according to the present invention can also be applied to an optical transmission system that transmits frames of other formats.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission device that transmits a frame to a correspondent device and receives a frame from the correspondent device, the transmission device comprising:
   a measurement unit configured to perform a delay measurement that measures a period of time from when a frame is transmitted to the correspondent device until when a corresponding frame is received from the correspondent device; and
   a delay decision unit configured to determine a transmission delay between the transmission device and the correspondent device based on a plurality of specified measurement results obtained from a plurality of delay measurements except for at least a first delay measurement among delay measurements performed by the measurement unit, wherein
   the measurement unit repeatedly performs the delay measurement a plurality of times to obtain a plurality of measurement results, and the delay decision unit determines the transmission delay based on two or more specified measurement results obtained from the plurality of delay measurements except for at least the first delay measurement among the plurality of delay measurements repeatedly performed by the measurement unit.

2. The transmission device according to claim 1, wherein the delay decision unit determines a transmission delay based on the plurality of specified measurement results when variation between the plurality of specified measurement results is smaller than a specified threshold.

3. The transmission device according to claim 1, wherein the measurement unit measures a period of time from when a value of a specified bit is changed in each frame transmitted at constant intervals to the correspondent device until when a frame having a value after the change set in the specified bit is received from the correspondent device in each delay measurement.

4. The transmission device according to claim 3, wherein
the measurement unit successively transmits to the correspondent device frames having the value after the change set in the specified bit, and measures a period of time from when the delay measurement starts until when a specified number of frames having the value after the change set in the specified bit are received successively from the correspondent device in each delay measurement.

5. The transmission device according to claim 3, further comprising
a comparison unit configured to compare the value of the specified bit in the frame to be transmitted to the correspondent device and the value of the specified bit in the frame received from the correspondent device, wherein
the measurement unit performs the delay measurements when the two values compared by the comparison unit are equal to each other.

6. The transmission device according to claim 1, further comprising
a monitoring unit configured to monitor a status of a transmission path between the transmission device and the correspondent device, wherein
the measurement unit terminates the delay measurement and outputs a message indicating a deterioration when the deterioration is detected on the transmission path by the monitoring unit.

7. The transmission device according to claim 1, wherein
the delay decision unit outputs a first measurement result, a last measurement result, an average value, a minimum value, or a maximum value among the plurality of specified measurement results.

8. A method for measuring transmission delay in a transmission system in which a frame is transmitted between a first transmission device and a second transmission device, the method comprising:
performing, a plurality of times, delay measurement that measures a period of time from when a frame is transmitted from the first transmission device to the second transmission device and until when a corresponding frame is returned from the second transmission device to the first transmission device; and
determining a transmission delay between the first transmission device and the second transmission device based on a plurality of specified measurement results obtained from a plurality of delay measurements except for at least a first delay measurement among delay measurements performed the plurality of times, wherein
the delay measurement is repeatedly performed a plurality of times to obtain a plurality of measurement results, and
the transmission delay is decided based on two or more specified measurement results obtained from the plurality of delay measurements except for at least the first delay measurement among the plurality of delay measurements.

9. The method for measuring transmission delay according to claim 8, wherein
a transmission delay is determined based on the plurality of specified measurement results when variation between the plurality of specified measurement results is smaller than a specified threshold.

10. The method for measuring transmission delay according to claim 8, wherein
the delay measurement measures a period of time from when a value of a specified bit is changed in each frame transmitted at constant intervals from the first transmission device to the second transmission device until when the first transmission device receives a frame having a value after the change set in the specified bit from the second transmission device.

11. The method for measuring transmission delay according to claim 10, wherein
frames having the value after the change set in the specified bit are successively transmitted from the first transmission device to the second transmission device, and
the delay measurement measures a period of time from when the delay measurement starts until when the first transmission device receives a specified number of frames having the value after the change set in the specified bit successively from the second transmission device.

12. The method for measuring transmission delay according to claim 10, further comprising
comparing the value of the specified bit in the frame to be transmitted to the second transmission device and the value of the specified bit in the frame received from the second transmission device, wherein
the delay measurement measures the transmission delay when the compared two values are equal to each other.

13. The method for measuring transmission delay according to claim 8, further comprising
monitoring a status of a transmission path between the first transmission device and the second transmission device, wherein
the delay measurement is terminated and a message indicating a deterioration is output when the deterioration is detected on the transmission path.

14. The method for measuring transmission delay according to claim 8, further comprising
outputting a first measurement result, a last measurement result, an average value, a minimum value, or a maximum value among the plurality of specified measurement results.

15. A method for measuring transmission delay in a transmission system in which a frame is transmitted between a first transmission device and a second transmission device, the method comprising:
waiting for a specified period of time to elapse while keeping a specified bit to a fixed value in each frame transmitted at constant intervals from the first transmission device to the second transmission device when an instruction to measure a transmission delay, the specified period of time being longer than a transmission time estimated based on a transmission distance between the first transmission device and the second transmission device;
repeatedly performing, a plurality of times, delay measurement that measures a period of time from when a value of the specified bit is changed in each frame transmitted from the first transmission device to the second transmission device at constant intervals until when the first transmission device receives from the second transmission device a frame having the value after the change set in the specified bit after the waiting for the specified period of time; and
determining a transmission delay between the first transmission device and the second transmission device based on a plurality of measurement results obtained from the delay measurements repeatedly performed the plurality of times.

16. A transmission device that transmits a frame to a correspondent device and receives a frame from the correspondent device, the transmission device comprising:

a measurement unit configured to perform a delay measurement that measures a period of time from when a frame is transmitted to the correspondent device until when a corresponding frame is received from the correspondent device; and a delay decision unit configured to determine a transmission delay between the transmission device and the correspondent device based on a plurality of specified measurement results obtained from a plurality of delay measurements except for at least a first delay measurement among delay measurements performed by the measurement unit, wherein the measurement unit repeatedly performs the delay measurement three or more times to obtain respective three or more measurement results, and the delay decision unit determines the transmission delay based on two or more specified measurement results among the three or more measurement results except for at least a first measurement result obtained in an initially performed delay measurement.

17. The transmission device according to claim 1, further comprising

N memories configured to respectively store measurement results obtained by the measurement unit, N being an integer of three or more, the N memories including a first memory, a second memory and a Nth memory, wherein the measurement unit repeatedly performs the delay measurement N times to obtain N measurement results, and sequentially stores the N measurement results in the first memory, the second memory, . . . and the Nth memory, and the delay decision unit determines the transmission delay based on N−1 measurement results stored in the second memory through the Nth memory.

* * * * *